United States Patent [19]

Sutoh

[11] Patent Number: 5,645,942
[45] Date of Patent: Jul. 8, 1997

[54] FOAM COATED ROLLS AND METHOD FOR PREPARING SAME

[75] Inventor: Manabu Sutoh, Chiba Prefecture, Japan

[73] Assignee: Dow Corning Toray Silicone Co., Ltd., Tokyo, Japan

[21] Appl. No.: 489,873

[22] Filed: Jun. 13, 1995

[30] Foreign Application Priority Data

Jun. 29, 1994 [JP] Japan ................... 6-170021

[51] Int. Cl.⁶ ................ B32B 15/04; B32B 5/14; B32B 27/08
[52] U.S. Cl. ............ 428/447; 428/448; 428/450; 428/308.4; 428/319.3; 428/906; 264/46.5
[58] Field of Search .................. 428/450, 447, 428/448, 308.4, 319.3, 319.7, 906; 264/46.5, 46.9, 54

[56] References Cited

U.S. PATENT DOCUMENTS

| | | | |
|---|---|---|---|
| 4,476,188 | 10/1984 | Blizzard et al. | 428/447 X |
| 4,728,567 | 3/1988 | Razzano | 428/447 X |
| 5,445,891 | 8/1995 | Kasuya | 428/450 |

*Primary Examiner*—Daniel Zirker
*Attorney, Agent, or Firm*—Robert Spector

[57] ABSTRACT

This invention provides foam-covered rolls comprising silicone foam layer over a metal core and a fluororesin film laminated over the foam layer. The cured foam layer is obtained by using as the blowing agent the hydrogen gas generated by the reaction of an organohydrogenpolysiloxane with a compound containing at least one hydroxyl group per molecule. The resultant rolls are very durable, highly toner-releasing and are free of creases on the roll surface. Using the fabrication method that constitutes one embodiment of the present invention, foam covered rolls can be produced very efficiently.

5 Claims, 1 Drawing Sheet

FOAM COATED ROLLS AND METHOD FOR PREPARING SAME

BACKGROUND OF THE INVENTION

1. Field of the Invention

This invention relates to foam-coated rolls that can be used in electrostatic copiers and various types of printers as hot rolls and as pressure rolls in fixing assemblies, as cleaning rolls in cleaning devices, and as transport rolls for recording media such as paper. This invention also relates to a method for preparing these rolls.

2. Background Information

The increasingly widespread use of electrophotographic copiers and laser printers has been accompanied by efforts to reduce the size and weight of these devices. The toner-fixing assembly used in these devices has accordingly also been reduced in scale, and a lower hardness has been required of the rubber-coated rolls used therein. In particular, a reliable nip width is required to achieve a stable paper transport between the pressure roll and hot roll.

Pressure rolls whose surface is covered with a single layer of silicone rubber have not exhibited the following property combination: low hardness plus a low coefficient of friction plus a smooth, flat surface plus wear resistance plus excellent paper-transfer performance. This has resulted in the use of multi-layer elastic rolls comprising a foam layer formed around a core member and a top layer of a fluororesin having a low coefficient of friction and excellent toner-release performance.

With regard to methods for fabricating multi-layer pressure rolls, Laid Open Japanese Patent Application [Kokai or Unexamined] Number Sho 59-61864 [61,864/1984] discloses a method whereby a heat-curable silicone rubber foam composition is applied over a metal roll core and subsequently foamed and cured to yield a foam roll. After the surface of this foam roll has been polished, a fluororesin latex is applied to the foam layer and then baked.

Laid Open Japanese Patent Application [Kokai or Unexamined] Number Hei 2-253285 [253,285/1990] teaches a method wherein an ambient temperature-curing rubber is used to bond the polished foam roll to a fluororesin film tube functioning as the outermost layer.

Unfortunately, both of these methods employ a complicated fabrication process with the associated negative cost consequences.

Other types of methods are disclosed in Japanese Patent Publication Number Hei 6-2353 [2,353/1994] and in Comparative Example 4 of Laid Open Japanese Patent Application [Kokai or Unexamined] Number Hei 2-253285 [253,285/1990]. In these methods, fluororesin tube-covered elastic rolls are fabricated by placing a fluororesin tube over the circumference of a metal roll core, injecting a heat-curing silicone rubber foam composition containing an organic compound as the blowing agent into the gap between the metal roll core and fluororesin tube, and then foaming and curing the curing the foam composition.

All of these prior art methods, however, require the application of high temperatures, typically from 150° C. to 220° C., to achieve foaming and curing. Because the heating period causes such phenomena as thermal expansion and thermal shrinkage to occur in the fluororesin tube and foam layer, there is a strong tendency in these methods for surface creasing to occur, and the fabrication of flat, smooth elastomer-coated rolls is thereby rendered highly problematic.

One objective of the present invention is to provide a foam-coated roll exhibiting a high level of toner release and the absence of problems associated with prior art rolls. A second objective of the present invention is to provide a highly productive method for fabricating this type of roll.

SUMMARY OF THE INVENTION

The foam-covered rolls of the present invention comprise a metal core covered with a silicone foam layer produced by the generation of hydrogen during curing of a liquid organosiloxane elastomer composition. The foam layer is covered with a layer of a fluororesin. The elastomer composition is cured and foamed at room temperature within a closed hollow cylindrical mold containing a continuous layer of a fluororesin on the wall of the mold and a metal roll core in the central portion of the mold.

DETAILED DESCRIPTION OF THE INVENTION

Figure 1:
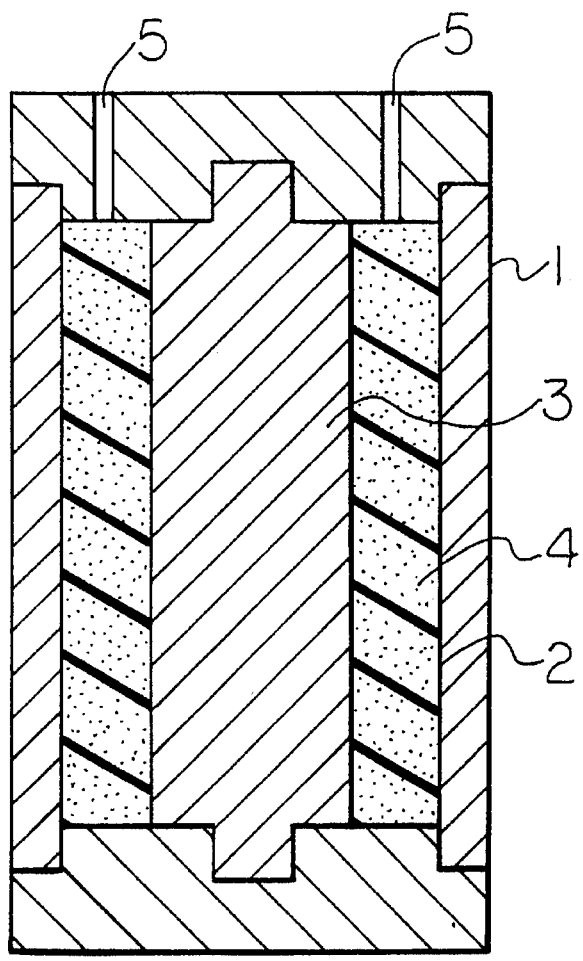
FIG. 1 is a longitudinal cross-section of a mold containing a roll prepared in accordance with the present method.

This invention provides an improved foam-coated roll comprising a metal roll core, a cured silicone foam layer covering said roll core and a fluororesin film covering said cured foam layer, wherein the improvement comprises the presence as said foam layer of a cured organosiloxane composition that has been foamed during curing of said layer using hydrogen generated by the reaction of an organohydrogensiloxane with a compound containing at least one hydroxyl group.

This invention also provides a method for preparing an foam-coated metal roll, said method comprising the sequential steps of A. forming a continuous layer of a fluororesin film on the interior surface of a hollow cylindrical mold, B. placing a metal roll core in the center of said cylindrical mold, C. injecting a curable and foamable liquid organosiloxane composition between said fluororesin film and the metal roll core, and D. foaming and curing said composition, wherein the foaming agent for the organosiloxane composition is the hydrogen gas generated by the reaction of a portion of the organohydrogenpolysiloxane used as a crosslinking agent for said composition with a compound containing at least one hydroxyl group.

To explain the present invention in greater detail, the metal roll used as the core of the foam-coated rolls of the present invention can be any metal roll core heretofore used for elastomer-coated rolls, and it is not otherwise specifically limited as to type and other qualities.

The metal core will typically be made of iron, aluminum, or stainless steel. The surface of the core roll has preferably been treated with a primer.

The main purpose for the outer layer of fluororesin film is to impart toner releasability to the surface of the foam-coated roll. This fluororesin film is also not specifically restricted as to type and other qualities, and any fluororesin film heretofore used for elastic rolls may be used in the present invention.

Useable fluororesin films include but are not limited to tetrafluoroethylene-perfluoroalkoxyethylene copolymers (PFA resin), films composed of tetrafluoroethylene resins (PTFE), and fluororubber films.

The foaming or blowing agent for the present organosiloxane compositions is the hydrogen generated by the reaction of the organohydrogensiloxane used as a curing agent for the composition with a compound containing at least one hydroxyl group.

The following composition is provided not only as a typical example of a curable, foamable organosiloxane composition useable for this purpose, but also as a type of organosiloxane composition preferred for use in accordance with the present method:

(A) 100 weight parts of an organopolysiloxane selected from the group consisting of
  (a) organopolysiloxanes with a viscosity at 25° C. of 1,000 to 100,000 centipoise (1 to 100 Pa.s) and containing at least 2 silicon-bonded hydroxyl groups in each molecule, and
  (b) organopolysiloxanes with a viscosity at 25° C. of 1,000 to 100,000 centipoise (1 to 100 Pa.s) and containing at least 2 silicon-bonded vinyl radicals in each molecule, (B) an organohydrogenpolysiloxane with a viscosity at 25° C. of from 1 to 100,000 centipoise (0.001 to 100 Pa.s) that contains at least 2 silicon-bonded hydrogen atoms in each molecule, the concentration of said organohydrogensiloxane being sufficient to provide a range of from 0.5:1 to 10:1 for the ratio between the number of moles of silicon-bonded hydrogen in this ingredient and the sum of the number of moles of hydroxyl groups and the number of moles of vinyl radicals in said organosiloxane composition;

(C) from 0.01 to 50 weight parts of at least one compound selected from the group consisting of water, alcohols, and low-molecular-weight liquid hydroxyl-functional organosiloxanes; and (D) an amount of a platinum—containing catalyst equivalent to from 0.1 to 1,000 weight parts of platinum metal for each million weight parts of ingredient A.

The ingredients of the liquid curable and foamable organosiloxane composition will now be described in detail.

The organopolysiloxane comprising ingredient A is the base ingredient of the organosiloxane composition. When ingredient A is an organopolysiloxane containing at least two silicon-bonded hydroxyl groups in each molecule, referred to hereinafter as ingredient (a), these hydroxyl groups may reside at terminal or non-terminal positions or at both types of positions.

The silicon-bonded organic groups present in ingredient (a) are hydrocarbon radicals that include but are not limited to alkyl radicals such as methyl, ethyl, propyl, and octyl; aryl radicals such as phenyl and naphthyl; and substituted alkyl radicals such as 3,3,3-trifluoropropyl. The organopolysiloxane used as ingredient (a) will generally have a straight-chain, branched-chain, or cyclic molecular structure, and may consist of only a single such structural type or may consist of a mixture of two or more of these structural types.

Ingredient (a) must have a viscosity at 25° C. of 1,000 to 100,000 centipoise (1 to 100 Pa.s). Viscosities below 1,000 centipoise cause the cured foam to have a low elongation and be brittle. Processing of the organosiloxane composition becomes problematic at viscosities in excess of 500,000 centipoise (500 Pa.s).

Organopolysiloxanes containing at least 2 silicon-bonded vinyl radicals in each molecule are referred to hereinafter as ingredient (b). The vinyl radicals may reside at terminal or non-terminal positions of the molecule or at both of these positions. The silicon-bonded organic groups bonded to silicon in addition to the vinyl radicals include but are not limited to alkyl radicals such as methyl, ethyl, propyl, and octyl; aryl radicals such as phenyl and naphthyl; and substituted alkyl radicals such as 3,3,3-trifluoropropyl.

The organopolysiloxanes used as ingredient (b) will generally have a straight-chain molecular structure, but a branched-chain or cyclic molecular structure is permissible. This organopolysiloxane may consist of only a single such structural type or may consist of a mixture of two or more of these structural types. This ingredient must have a viscosity at 25° C. of 1,000 to 100,000 centipoise (1 to 100 Pa.s). Viscosities below 1,000 centipoise cause the cured foam to have a low elongation and be brittle. Handling of the curable becomes problematic at viscosities in excess of 500,000 centipoise.

Ingredient A may consist only of at least one hydroxyl-functional organopolysiloxane (a), only at least one vinyl-functional organopolysiloxane (b), or mixtures of at least one each of these two types of organopolysiloxanes.

The organohydrogenpolysiloxane used as ingredient B must contain at least 2 silicon-bonded hydrogen atoms in each molecule. The silicon-bonded hydrogen atoms may be present in terminal or non-terminal position or at both positions. The organic groups bonded on silicon atoms include but are not limited to alkyl radicals such as methyl, ethyl, propyl, and octyl; aryl radicals such as phenyl and naphthyl; and substituted alkyl radicals such as 3,3,3-trifluoropropyl. Ingredient B does not contain any ethylenically unsaturated groups such as vinyl radicals.

Ingredient B will generally have a straight-chain molecular structure, however branched-chain, three-dimensional, and cyclic molecular structures are permissible. This organohydrogenpolysiloxane may consist of only a single such structural type or may consist of mixture of two or more of these structural types. This ingredient must have a viscosity at 25° C. of 1 to 100,000 centipoise (0.001 to 100 Pa.s), and it must be added in a quantity that affords values of 0.5:1 to 10:1 for the ratio between the number of moles of silicon-bonded hydrogen atoms in this ingredient and the sum of the number of moles of hydroxyl groups and vinyl radicals in the curable organosiloxane composition.

The organosiloxane composition will not cure satisfactorily when this ratio is less than 0.5:1, while a satisfactory mechanical strength following curing will not be obtained when this ratio exceeds 10:1.

Ingredient C supplies hydroxyl groups for reaction with the silicon-bonded hydrogen atoms in ingredient B to produce at least a portion of the hydrogen required for foam generation. Ingredient C consists of at least one compound selected from water, alcohols, and low-molecular-weight liquid hydroxyl-functional organosiloxanes.

Alcohols suitable for use as ingredient C include but are not limited to ethyl alcohol, n-propyl alcohol, and 1,4-butanediol. Examples of low-molecular-weight hydroxyl-functional organosiloxanes include alpha, omega-dihydroxy-polydimethylsiloxanes having degrees of polymerization less than 1,000.

The concentration of ingredient C should be from 0.01 to 50 weight parts, preferably from 0.1 to 20 weight parts, per 100 weight parts of ingredient A.

The catalyst referred to in this specification as ingredient D is a curing catalyst for the present organosiloxane compositions. Platinum-containing catalysts are typically used for this purpose. Examples of suitable catalysts include but are not limited to platinum micropowder, chloroplatinic acid, chloroplatinic acid/olefin complexes, alcohol solutions of chloroplatinic acid, and chloroplatinic acid/alkenylsiloxane complexes. Microparticles of a thermoplastic resin containing one of the platinum catalysts listed above are also suitable.

The concentration of platinum-containing catalyst is equivalent to from 0.1 to 1,000 weight parts, preferably from 1 to 100 weight parts, of platinum metal per 1,000,000 weight parts of ingredient A. The properties of the cured foam will be unacceptable at concentrations less than 0.1 weight part, based on platinum, while the use of more than 1,000 weight parts is uneconomical.

The curable compositions of the present invention are prepared simply by mixing ingredients (A) to (D) to homogeneity. The resulting composition must have a viscosity at 25° C. of from 100 to 500,000 centipoise (0.1 to 500 Pa.s). Viscosities below 100 centipoise are associated with such problems as foam collapse and a strong tendency for irregular cells to be produced. Viscosities higher than 500,000 centipoise make it difficult in inject the curable organosiloxane composition into the mold, which creates problems such as unduly long injection times and the need for excessively high injection pressures.

Although the present compositions must contain ingredients (A) to (D) as described in the preceding sections of this specification, these compositions may also contain various optional additives insofar as the objectives of the present invention are not impaired. These additives include but are not limited to pigments, heat stabilizers, flame retardants, and internal mold-release agents.

The steps of the present method for fabricating foam-covered rolls will now be described in detail.

With respect to the fabrication of foam-covered rolls comprising a silicone foam layer on a metal core and a fluororesin film layer covering the silicone foam layer, the present method for fabricating the rolls is characterized by the steps of 1) forming the interior surface of a hollow cylindrical mold with a continuous fluororesin film, 2) placing a metal roll core in the center of the cylindrical mold, 3) injecting the curable and foamable liquid organosiloxane composition described in the preceding section of this specification into the space between the film and the metal roll core, and then 4) foaming and curing the composition at room temperature.

Figure 2:
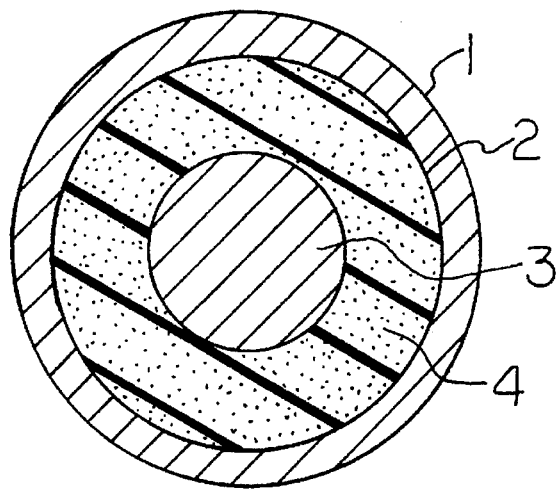
FIG. 2 is a transverse cross-section of a roll prepared in accordance with the present invention.

The steps of the present method for fabricating foam-covered rolls are explained with reference to the accompanying FIGS. 1 and 2.

The first step of the present fabrication method is placing a preformed film of a fluororesin 2 along the interior wall of a hollow cylindrical mold 1. A metal core 3 is then inserted in the center of the cylindrical mold 1.

Suitable fluororesins for preparing the film are described in a preceding section of this specification. The thickness of the fluororesin film is typically from 20 to 100 micrometers.

To improve bonding with the silicone foam, the exposed surface of the fluororesin film 2 is preferably roughened by treatment with alkali or by etching.

The curable and foamable liquid organosiloxane composition described in the preceding section of this specification is then injected under pressure through injection inlets 5 into the space between the fluororesin film 2 and the metal roll core 3. The organosiloxane composition is then foamed and cured to form a foam layer 4 by maintaining it for a prescribed period of time at room temperature.

The finished article removed from the mold is a fixing roll comprising a layer of a cured organosiloxane foam 4 on the metal core 3 with a fluororesin layer 2 covering the foam layer 4. One of the unique features of the present method is that foaming and curing of the organosiloxane composition are carried out at ambient temperature.

EXAMPLES

The invention will be explained in greater detail by means of working examples which are not intended to limit the scope of the accompanying claims. Unless otherwise specified all parts and percentages in the examples are by weight and the reported viscosity values were measured at 25° C.

The properties referenced in the examples were evaluated using the following test methods.

Roll Moldability

The appearance of the molded fixing roll was inspected visually, and a rating of "excellent" was applied only when the fixing roll was a completely satisfactory product.

Foam characteristics

After molding of the fixing roll had been completed, the layer of cured foam formed on the metal roll core was sectioned with a knife and the internal cell structure was examined using a microscope.

Properties of the roll surface

After molding of the fixing roll had been completed, the appearance of its surface was visually evaluated for the presence of creases and the extent of roughness or unevenness.

Example 1

The following ingredients were mixed to homogeneity:

100 parts of a dimethylvinylsiloxy-endblocked dimethylpolysiloxane with a viscosity of 10,000 centipoise (10 Pa.s) and a vinyl content of 0.14 weight percent;

20 parts of a hydroxyl-endblocked dimethylpolysiloxane with a viscosity of 80 centipoise (0.08 Pa.s);

20 parts of a trimethylsiloxy-endblocked methylhydrogenpolysiloxane with a viscosity of 20 centipoise (0.02 Pa.s), 5 parts of a perfluoroalkyl-containing silicone copolymer with a viscosity of 10 centipoise (0.01 Pa.s) as a foam stabilizer;

1.3 parts 1-propanol; and 20 parts crystalline silica micropowder.

The following ingredients were blended to homogeneity into the resultant mixture to yield a curable, foamable liquid organosiloxane composition that foamed due to the generation of hydrogen gas by the reaction of the organohydrogensiloxane with the hydroxyl-containing compounds present in the composition:

0.2 part of a methylvinylsiloxane cyclic tetramer; and 0.5 part of a complex of chloroplatinic acid hexahydrate, ethanol, and divinyltetramethyldisiloxane.

The resultant composition had a viscosity of 5,000 centipoise (5 Pa.s) prior to initiation of curing, a working time of 5 minutes, a foaming completion time of 8 minutes at room temperature, an expansion ratio of 3.5-fold, and a post-foaming hardness of 20 degrees as measured with an Asker C hardness tester.

A hollow cylindrical mold with a chromium-plated interior surface was then prepared. The wall of the mold 1 was 400 mm wide, 40 mm in diameter and 5 mm thick.

A cylindrical film 2 composed of tetrafluoroethyleneperfluoroalkoxyethylene copolymer was then placed along the interior surface of the cylindrical wall of the mold.

An iron roll core 3 (length of cylindrical section l=300 mm, diameter d=5 mm) was then placed in the center of the mold, and the curable and foamable liquid organosiloxane composition described in the preceding section of this example was then injected under a pressure of 2 kg/cm2 through injection port 5.

Foaming and curing were conducted under ambient temperature (25° C.) for 15 minutes without further manipulation of the composition. The final product, a fixing roll, was then removed from the mold.

The resulting fluororesin-coated silicone rubber foam roll gave the following evaluations: Moldability=excellent, foam characteristics=excellent, cell structure= homogeneous.

The surface of this roll was smooth and free of creases.

Comparative Example 1

A heat-curable silicone rubber sponge composition was prepared by mixing the following ingredients to homogeneity: 100 parts of a dimethylvinylsiloxy-endblocked dimethylsiloxanemethylvinylsiloxane copolymer with a viscosity of 10,000 centipoise, 20 parts fumed silica, 1.5 parts of a hydroxyl-endblocked dimethylpolysiloxane with a viscosity of 100 centipoise (0.1 Pa.s), 3 parts azobis (isobutyronitrile) as blowing agent, and 0.5 part 2,4-dichlorobenzoyl peroxide and 2.0 parts dicumyl peroxide as curing agent.

This composition was used to mold a roll according to the procedure outlined in Example 1, but in this case the foaming/curing conditions were 30 minutes at 150° C. The characteristics of the resultant sponge-covered roll were evaluated as the same manner as the sample described in Example 1. In this case it was found that the roll surface contained a large number of elevations and depressions and a large amount of creasing. This roll could not, therefore, be used as a fixing roll.

That which is claimed is:

1. In an improved foam-coated roll comprising a metal roll core, a cured silicone foam layer covering said roll core and a fluororesin film covering said cured foam layer, the improvement comprising the presence as said foam layer of a cured organosiloxane composition that has been foamed during curing of said composition using hydrogen generated by the reaction of an organohydrogensiloxane with an effective amount of a compound containing at least one hydroxyl group.

2. In an improved foam-coated roll comprising a metal roll core, a cured silicone foam layer covering said roll core and a fluororesin film covering said cured foam layer, the improvement comprising the presence as said foam layer of a cured organosiloxane composition that has been foamed during curing of said composition using hydrogen generated by the reaction of an organohydrogensiloxane with an effective amount of a compound containing at least one hydroxyl group and wherein said composition has a viscosity at 25° C. of 100 to 500,000 centipoise (0.1 to 500 Pa.s) and comprises (A) 100 weight pads of at least one organopolysiloxane selected from the group consisting of
  (a) organopolysiloxanes exhibiting a viscosity at 25° C. of from 1,000 to 100,000 centipoise (1 to 100 Pa.s) and containing at least two silicon-bonded hydroxyl groups in each molecule and
  (b) organopolysiloxanes exhibiting a viscosity at 25° C. of from 1,000 to 100,000 centipoise (1 to 100 Pa.s) and containing at least 2 silicon-bonded vinyl radicals in each molecule;

(B) an organohydrogenpolysiloxane exhibiting a viscosity at 25° C. of from 1 to 100,000 centipose (0.001 to 100 Pa.s) and containing at least two silicon-bonded hydrogen atoms in each molecule, in a quantity sufficient to provide a ratio of from 0.5:1 to 10:1 for the number of moles of silicon-bonded hydrogen atoms in ingredient B and the total of the number of moles of hydroxyl groups and the number of moles of vinyl radicals present in said composition;

(C) from 0.01 to 50 weight parts of at least one compound selected from the group consisting of water, alcohols, and low-molecular-weight liquid hydroxyl-functional organosiloxanes; and (D) an amount of a platinum—containing catalyst equivalent to from 0.1 to 1,000 weight per parts of platinum metal for each million weight parts of ingredient A.

3. A roll according to claim 2 wherein the composition contains at least one organopolysiloxane containing at least two vinyl radicals per molecule.

4. A method for fabricating a foam-coated roll comprising a cured silicone foam layer on a metal core and a fluororesin film layer laminated on said foam layer, said method comprising the sequential steps of A. forming a continuous layer of a fluoresin film on the interior surface of a hollow cylindrical mold, B. placing a metal roll core in the center of said cylindrical mold, C. injecting a curable and foamable liquid organosiloxane composition between said fluororesin film and the metal roll core, and D. foaming and curing said composition; wherein the blowing agent for said foam is hydrogen gas generated by the reaction of an organohydrogenpolysiloxane with an effective amount of a compound containing at least one hydroxyl group during curing of said foam, and said organohydrogenpolysiloxane and said compound are ingredients of said organosiloxane composition.

5. A method according to claim 4 wherein said foam is cured by the reaction of said organohydrogenpolysiloxane with at least one compound selected from the group consisting of (a) organopolysiloxanes exhibiting a viscosity at 25° C. of 1,000 to 100,000 mPa.s (centipoise) and containing at least two silicon-bonded hydroxyl groups in each molecule and (b) organopolysiloxanes exhibiting a viscosity at 25° C. of 1,000 to 100,000 mPa.s (centipoise) and containing at least two silicon-bonded vinyl radicals in each molecule.

* * * * *